May 29, 1951        H. F. ELLIOTT        2,555,119

PLANETARY VARIABLE SPEED FRICTION TRANSMISSION

Filed Jan. 17, 1946        2 Sheets-Sheet 2

INVENTOR
HAROLD F. ELLIOTT
BY
William D. Hall
ATTORNEY

Patented May 29, 1951

2,555,119

UNITED STATES PATENT OFFICE 2,555,119

PLANETARY VARIABLE SPEED FRICTION TRANSMISSION

Harold F. Elliott, San Francisco, Calif., assignor to the United States of America as represented by the Secretary of War Application January 17, 1946, Serial No. 641,838

3 Claims. (Cl. 74—796)

This invention relates to a variable speed control mechanism and more particularly to a variable speed drive unit in which infinite variation in ratio of movement of driving and driven members may be obtained from reverse to maximum speed in the forward direction.

Heretofore, variable speed drive units have obtained speed control by means of a system of gears. The present invention contemplates a speed control unit in which the use of toothed gears between input and output of a train is entirely eliminated and it has the advantages over the usual type of speed control units of quieter operation, smaller physical dimensions, and greater range of speed control.

Accordingly, it is one of the objects of the present invention to provide a variable speed drive mechanism capable of infinite variation in ratio of driving and driven members.

It is another object of the invention to provide a variable speed control unit characterized by being quieter in operation, of smaller physical dimensions and having a wider range of speed control than conventional variable speed drives.

Other objects, features and advantages of this invention will suggest themselves to those skilled in the art and will become apparent from the following description of the invention taken in connection with the accompanying drawings, in which.

Figure 1:
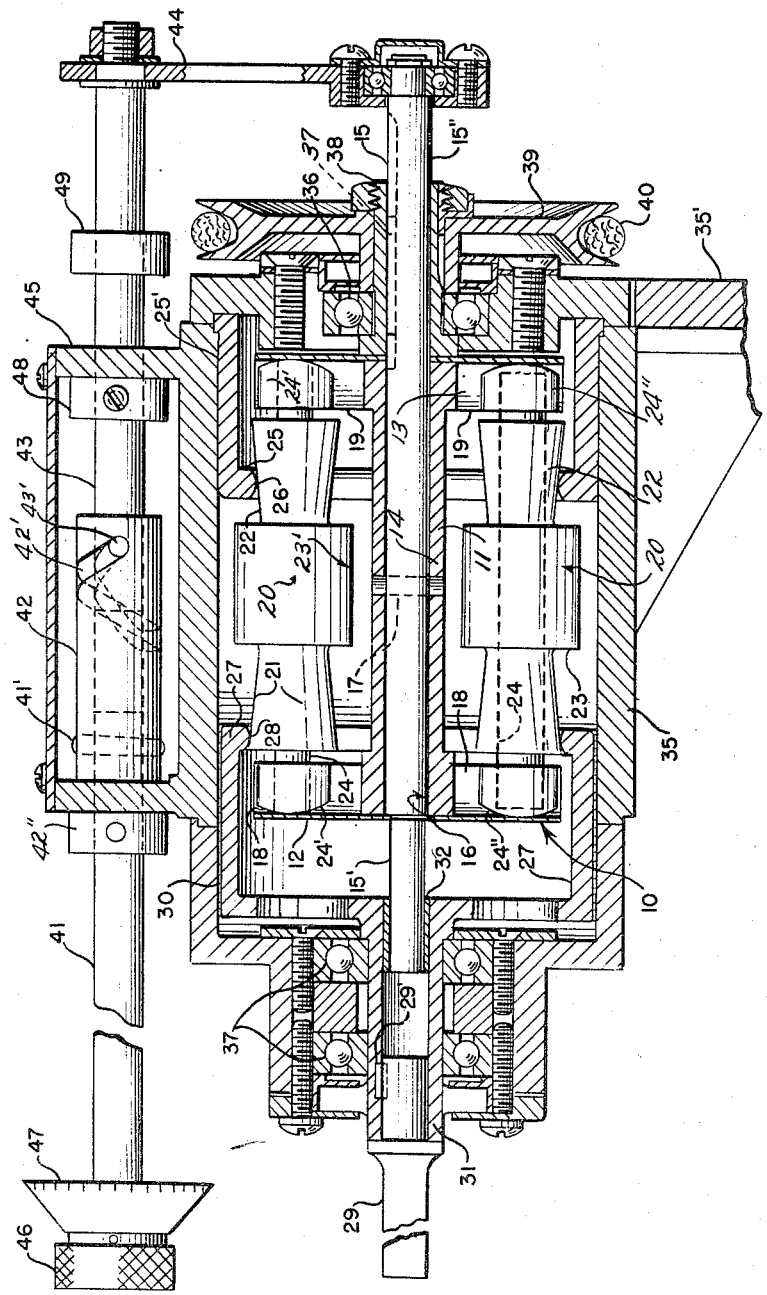
Fig. 1 is a longitudinal sectional view of the variable speed control unit according to the present invention.
Figure 2:
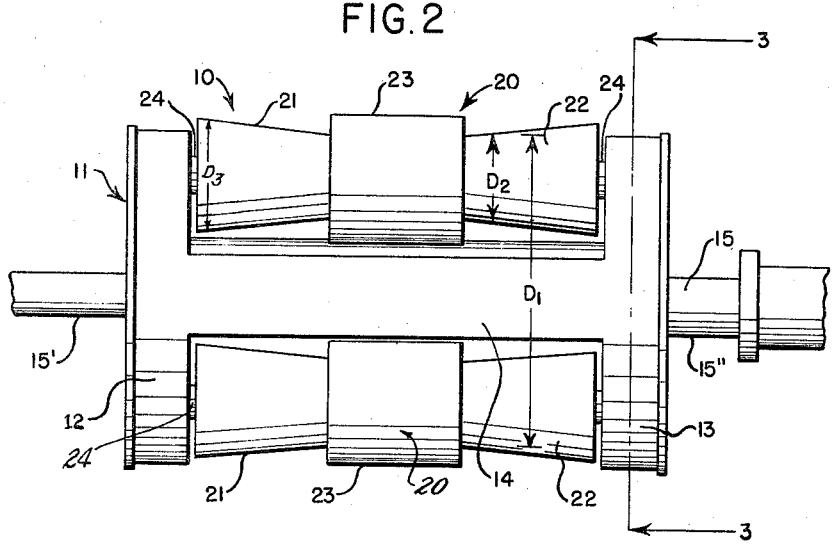
Fig. 2 is a front elevational view of one of the components of the unit according to the invention.
Figure 3:
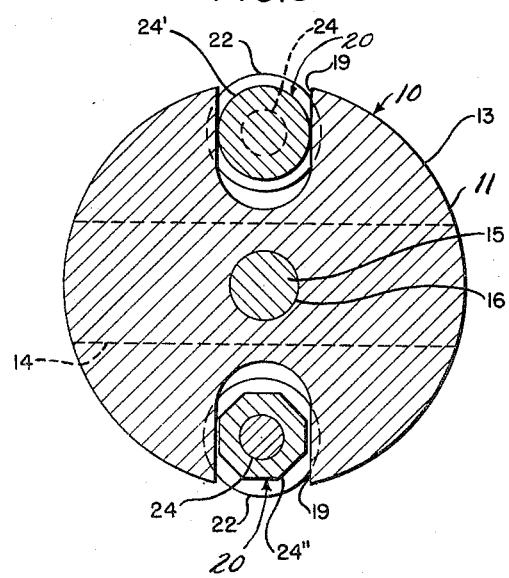
Fig. 3 is a cross section along the line 3—3 of Fig. 2.

In the drawing, Fig. 1 shows a completely assembled speed control unit according to the invention, one of the component parts of which is a carrier and roller assembly generally designated 10, which is illustrated more clearly in Fig. 2 and Fig. 3. Assembly 10 comprises a carrier member 11 having circular end plates or carrier heads 12 and 13 secured together in rigid parallel spaced relation by a planiform plate member 14 disposed perpendicularly to the carrier heads 12 and 13, the plane of the plate 14 being diametral to the heads 12 and 13. The heads and the connecting plate 14 may, if desired, be made as one integral member. Carrier member 11 is axially engaged and secured upon an input main driving shaft 15.

As shown in Fig. 1, carrier member 11 is provided with a bore 16 extending axially through end plates or heads 12 and 13 and longitudinally through plate 14. Shaft 15 extends through bore 16 with its end sections 15' and 15" projecting beyond heads 12 and 13, respectively, shaft 15 being secured within bore 16 by retaining pin 17. The mutually opposed or inner faces of end heads 12 and 13 have therein respectively, two radial diametrically opposite slots 18 and 19 all in a plane at right angles to the plate 14, and all opening on the peripheries of the respective end plates.

Each one of two roller members 20 has trunnion ends rotatably mounted in respective box bearings 24' shown above in Figs. 1 and 3, radially slidable in the aligned slots 18 and 19. Each roller member 20 comprises conical roller sections 21 and 22, the diameters of which gradually diminish, preferably toward the center of roller 20. As more clearly explained hereinafter, roller sections 21 and 22 may have different maximum and minimum dimensions with different degrees of taper. If desired, roller 20 may be provided medially thereof with a substantially cylindrical body member 23 separating roller sections 21 and 22 and providing additional weight and balance to roller 20. By reason of the mounting of the rollers as described each roller may freely rotate on its own axis relative to the carrier and also either or both ends of the roller may slide radially on the carrier. If desired, roller 20 may be rigidly or freely mounted on a single shaft 24 extending axially through and beyond both ends of roller 20, to form the trunnions (as dotted in the lower part of Fig. 1). If desired, each of the ends of shaft 24 may be rotatably mounted in a nut-shaped box bearing 24" which is nonrotatably but slidably mounted in slots 18 and 19 as indicated in the lower portion of Fig. 3.

As thus described, it will be understood that upon rotation of shaft 15, carrier member 11 will be rotated therewith and by centrifugal force each of rollers 20 will tend to move radially in slots 18 and 19 away from shaft 15 while each of rollers 20 is free to rotate about its axis.

A stationary contact or ring member 25 is fixed independently of carrier and roller assembly 10. Ring member 25 is concentric with carrier 11 and projected inwardly, surrounding one end portion of carrier member 11 so as to engage the tapered peripheral surface of each of roller sections 22. It has an inner surface 26 substantially semi-circular in radial section. Surrounding the opposite end portion of carrier member 11 is a rotatable contact or ring member 27 having an inner bearing surface 28 adapted to engage the tapered peripheral surface of each of roller sections 21. Ring 27 is secured to or rigidly mounted on an output shaft 29 in any suitable manner. For example, as shown, ring 27 may be part of a substantially cylindrical sleeve 30 having a neck or hub portion 31 which is secured to output shaft 29 by a key 29'. If desired ring 27, sleeve 30, neck portion 31 and shaft 29 may be made as a single integral member. The inner end of neck portion 31 is tubular and is adapted to receive and to act as a bearing for the end 15' of main shaft 15, whereby shaft 15 is adapted to rotate and to slide longitudinally relative to neck portion 31. If desired, a bush bearing or other bearing may be disposed between shaft end 15' and neck portion 31 as formally indicated at 32.

Any suitable framing may be provided for supporting the structure as thus far described so that the carrier and roller assembly 10 is capable of rotation and also capable of being axially moved relative to ring members 25 and 27. One means of supporting this structure is shown in Fig. 1 in which a housing 35 with bracket 35' generally incloses the roller and carrier assembly 10, rings 25 and 27 and the bearing portion of shafts 15 and neck 31. Interposed between housing 35 and the shaft 15 at the right, and between the housing and neck portion 31 at the left, are ball bearings 36 and 37, respectively, for supporting and permitting rotation of shafts 15 and 29. Preferably a sleeve member 38 is interposed between bearing 36 and shaft 15, being held by a feather key 37 slidably on shaft 15. Rotational movement may be imparted to shaft 15 by a pulley 39, fixed on sleeve 38, and driven by belt 40 from a motor (not shown) which may be mounted as found convenient. With this arrangement, fixed ring member 25 may be an integral inwardly disposed projection of housing 35 or, as shown, may be an inwardly disposed flange of a sleeve 25' secured to housing 35.

For shifting the carrier and roller assembly, a shift shaft 41 is revolubly mounted on an extension 45 of the framing 35, parallel to the axis of input shaft 15. It has secured thereon by key 41' or otherwise a coaxial cylindrical worm sleeve 42 having a spiral slot 42' therein. A rod 43 is slidably mounted in the housing part 45, one end being fitted slidably in the sleeve 42 and having a radial cam pin 43' fixed thereon engaged slidably in the slot 42' of the sleeve 42. Fixed on the opposite and rear end of the rod 43 there is a lateral arm 44, its outer end revolubly connected to the end of the input drive shaft 15. A knurled knob 46 with a skirt marked with a scale 47 is secured to the end of the shaft 41 distant from the support 45, for use in effecting actual movement of the carrier 11 and roller assembly, as will appear, by rotation of the knob 46. The shaft 41 turns the sleeve 42 so that the side of the worm slot 42' wipes against the cam pin 43' reciprocating the rod 43 and arm 44 longitudinally of the transmission, carrying with them the shaft 15 and roller assembly. Stop collars 48 and 49 are pinned on the rod 44 at opposite sides of a wall portion of the housing 45 through which the rod 43 extends, so as to limit movement of the rod. Longitudinal movement of the shaft 41 is prevented by the sleeve 42 and a stop collar 42'' pinned to the shaft 41, the sleeve and collar being located at opposite sides of a second wall portion of the support 45.

In operation, rotation of input drive shaft 15 causes carrier member 11 to be rotated about its axis, and, by centrifugal force, rollers 20 slide radially outward in their bearings guided by slots 18 and 19. When roller parts 22 come in frictional contact with fixed ring 25 rotary motion is imparted to rollers 20. Rotation of rollers 20 resulting from engagement of the tapered parts 21 with ring 28, in turn imparts rotation, by frictional contact, to the freely rotatable ring 27 causing output drive shaft 25 to rotate with this ring.

Referring now to Fig. 2, $D_1$ designates the diameter of bearing surface 26 in relation to the rolls 20. $D_2$ and $D_3$ indicate the diameters of roller sections 22 and 21 at the points of contact with the bearing surfaces 26 and 28 of ring members 25 and 27 respectively, in the positions of the parts shown in Fig. 1. It may be understood that the speed of translative or orbital revolution of roller section 21 in one direction (the forward direction) about the axis of shaft 15 is equal to that of input shaft 15 which may be designated M. Then the speed of revolution of roller section 21 in the opposite or reverse direction may be stated as:

$$M \times \frac{D_1}{D_2} \div \frac{D_1}{D_3} \text{ or } M\frac{D_3}{D_2}$$

It will be seen that the output speed—that is, the speed of revolution of output shaft 29—depends on the ratio of the respective diameters of roller sections 21 and 22 at the points of contact with rings 25 and 27 or the net speed of roller section 21. Thus it may be stated:

$$\text{Output speed} = M\left(1 - \frac{D_3}{D_2}\right)$$

Thus, when $D_2 = D_3$, the output speed will be zero. Also when $D_2$ is larger than $D_3$ the rotation of output shaft 29 will be in the forward direction relative to shaft 15, and rotation of output shaft 29 will be in the reverse direction when $D_3$ is larger than $D_2$, the output speeds in either direction being proportional to the respective diameters of roller sections 21 and 22 at the points of contact with ring members 25 and 27. It will therefore be understood that carrier member 10 may be axially shifted until a point is reached where $D_2 = D_3$ and there is no rotation of output shaft 29. By axially shifting carrier member 10 in opposite directions from this zero point a proportional speed of rotation of shaft 29 is obtained in the forward and reverse directions. Assuming that the roller sections 21 and 22 have different degrees of taper and are tapered in opposite directions as shown in Fig. 2 and are also so designed that $D_2 = D_3$ is substantially midway of the length of each roller section, it will be seen that, by axially shifting carrier member 10 from its extreme forward position to the extreme opposite direction, the speed of rotation of output shaft 29 will vary from a maximum in the forward direction through zero to a maximum in the reverse direction.

It will be understood that the difference in the diameters of roller sections 21 and 22 will result in the output drive shaft 29 having a different speed of rotation than that of the input drive shaft 15. By proper design of the respective diameters and of the tapers of roller sections 21 and 22, it will be obvious that an infinite variation of speed differential may be obtained with constant speed of revolution applied to shaft 15. It will also be understood that the carrier and roller assembly 10 may be axially movable to provide the desired speed control from one direction to the reverse direction by causing ring members 25 and 27 to ride along different peripheral portions of the tapered surfaces of roller members 21 and 22.

While there has been here described what is at present considered the preferred embodiments of the invention, it will be obvious to those skilled in the art that various changes and modifications may be made therein without departing from the spirit or scope of the invention.

What is claimed:

1. A variable speed drive mechanism comprising a support, an input drive shaft slidably and revolubly mounted on said support, a carrier fixed on said input shaft, said carrier having an end head at each end normal to the axis of the shaft, said heads being mutually connected in rigid spaced parallel relation, the opposing faces of said heads having a plurality of radial slots therein, each said slot in one head being aligned with one slot in the other head to afford pairs of aligned slots, a roller member rotatably and slidably journalled in each said pair of slots with its axis arranged generally longitudinally of said carrier whereby each said roller member will rotate orbitally with said carrier around the axis of the carrier and tend to move radially in said heads by centrifugal force, while free to rotate about its own axis, each said roller member comprising at least two coaxial roller sections fixedly connected with each other, the diameter of at least one said roller section being gradually varied longitudinally in relation to the diameter of the other section of the same roller from one end to the other, to form at least one truncated cone-shaped roller section, a stationary annular contact member fixed with said support and surrounding one end of said carrier, said contact member having a circular inner contact surface arranged so as to frictionally contact a peripheral portion of each adjacent said roller sections, and constructed to frictionally impart rotary motion to the engaged parts of said rollers when said rollers move radially into contact with said contact surface and are moved orbitally thereagainst, a rotatable driven contact member surrounding the opposite end of said carrier member having a circular inner contact face spaced axially from said stationary contact member a distance approximating the distance between medial parts of the roller sections of one said roller, an output shaft journalled on said support and connected in driven relation to said rotatable contact member, said rotatable driven contact member having a substantially circular inwardly presented bearing surface positioned to contact the peripheral portions of the roller sections at the opposite ends of said rollers from the stationary contact member, whereby rotation of said rollers imparts rotation to said rotatable contact member and said output shaft, a rotatable shift shaft mounted on said support parallel to said input shaft, a spirally channeled sleeve axially fixed on and extended axially from said shift shaft, a shifter rod slidably engaged in the sleeve having a lateral cam engaged in the channel of the sleeve, and a radial arm rigidly fixed on the free end of said rod and connected revolubly to said input shaft, whereby rotation of said shifter shaft moves said rod, input shaft, and carrier axially for varying the speed of revolution of said output shaft in relation to the speed of the input shaft.

2. The structure of claim 1 wherein a revoluble driving member is revolubly mounted on said support outwardly of one limit of reciprocating movement of said carrier and secured against movement axially on the support, said drive shaft being slidable through and keyed in said driving member, means to operate the driving member, said rotatable driven contact member having a hub revoluble on said support outwardly of the limit of reciprocating movement of the carrier opposite said driving member, said drive shaft having an adjacent end revoluble in said hub, and said output shaft being fixed coaxially on said hub.

3. A variable speed mechanism as in claim 1, each roller member having a cylindrical central body portion coaxial therewith of greater diameter than, and separating said roller sections, said cylindrical member having substantial mass in relation to the remainder of the roller, said stationary and said revoluble contacts being spaced apart approximately the sum of axial length of the cylindrical member and one said roller section and being projected inwardly so as to engage the conical portions of said roller sections and clear the larger end portions of the latter.

HAROLD F. ELLIOTT.

REFERENCES CITED

The following references are of record in the file of this patent:

UNITED STATES PATENTS

| Number | Name | Date |
|---|---|---|
| 491,896 | Layton | Feb. 14, 1893 |
| 994,537 | Rhodes | June 6, 1911 |
| 1,370,080 | Ahond | Mar. 1, 1921 |
| 1,822,335 | Brown | Sept. 8, 1931 |
| 2,328,536 | Bade | Sept. 7, 1943 |
| 2,501,936 | Gayer | Mar. 28, 1950 |

FOREIGN PATENTS

| Number | Country | Date |
|---|---|---|
| 605,350 | France | Apr. 25, 1926 |